Sept. 7, 1965

F. S. JABSEN

3,205,144

REACTOR FUEL HOLD-DOWN ASSEMBLIES

Filed Aug. 25, 1961

INVENTOR.
Felix S. Jabsen
BY
ATTORNEY

Sept. 7, 1965          F. S. JABSEN          3,205,144

REACTOR FUEL HOLD-DOWN ASSEMBLIES

Filed Aug. 25, 1961          8 Sheets-Sheet 2

FIG. 2

INVENTOR
Felix S. Jabsen
BY
*J. P. Moran*
ATTORNEY

Sept. 7, 1965 F. S. JABSEN 3,205,144
REACTOR FUEL HOLD-DOWN ASSEMBLIES
Filed Aug. 25, 1961 8 Sheets-Sheet 3

FIG. 3

INVENTOR.
Felix S. Jabsen
BY
ATTORNEY

Sept. 7, 1965    F. S. JABSEN    3,205,144
REACTOR FUEL HOLD-DOWN ASSEMBLIES
Filed Aug. 25, 1961    8 Sheets-Sheet 4

INVENTOR.
Felix S. Jabsen
BY
*J. P. Moran*
ATTORNEY

Sept. 7, 1965  F. S. JABSEN  3,205,144
REACTOR FUEL HOLD-DOWN ASSEMBLIES
Filed Aug. 25, 1961  8 Sheets-Sheet 5

INVENTOR
Felix S. Jabsen
BY
ATTORNEY

Sept. 7, 1965  F. S. JABSEN  3,205,144
REACTOR FUEL HOLD-DOWN ASSEMBLIES
Filed Aug. 25, 1961  8 Sheets-Sheet 6

INVENTOR
Felix S. Jabsen
BY
ATTORNEY

Sept. 7, 1965          F. S. JABSEN          3,205,144

REACTOR FUEL HOLD-DOWN ASSEMBLIES

Filed Aug. 25, 1961          8 Sheets-Sheet 7

INVENTOR
Felix S. Jabsen
BY
ATTORNEY

Sept. 7, 1965 F. S. JABSEN 3,205,144
REACTOR FUEL HOLD-DOWN ASSEMBLIES
Filed Aug. 25, 1961 8 Sheets-Sheet 8

INVENTOR
Felix S. Jabsen
BY
ATTORNEY

United States Patent Office 3,205,144
Patented Sept. 7, 1965

3,205,144
REACTOR FUEL HOLD-DOWN ASSEMBLIES
Felix S. Jabsen, Lynchburg, Va., assignor to The Babcock & Wilcox Company, New York, N.Y., a corporation of New Jersey
Filed Aug. 25, 1961, Ser. No. 133,945
8 Claims. (Cl. 176—50)

This invention relates in general to nuclear reactors, but more particularly it is concerned with the arrangement of the various elements which make up the core and other internals within a reactor.

In order to operate a power reactor for an appreciable period of time, the core must contain an excess of fuel in addition to that required to provide a critical mass. This excess fuel represents the amount which may be consumed during the operation of the reactor. The presence of the excess fuel within the reactor makes available a quantity of neutrons greater than that required to assure a chain reaction, and these excess neutrons must in some way be absorbed or an uncontrolled chain reaction would result.

In most of our present-day water reactors control rods are used to absorb the excess neutrons. However, the control rods, which contain a high neutron absorption cross-section material such as hafnium and cadmium, nonproductively absorb the excess neutrons. One the excess neutrons are captured by control rods, they cannot be productively absorbed in fertile material for conversion into fissionable material.

In the copending applications of Milton C. Edlund, Serial Nos. 662,458 and 22,145, filed May 29, 1957, and April 14, 1960, respectively, by the common assignee, now Patents 3,081,246, issued March 12, 1963, and 3,142,624, issued July 28, 1964, there is disclosed a control concept, referred to as spectral shift or moderator control which permits reactor control while greatly reducing the nonproductive absorption of excess neutrons in high neutron absorption cross-section material. While this control concept is broadly applicable to mixtures of moderator materials having different slowing-down powers, this invention is primarily concerned with the use of a combined moderator-coolant mixture of light and heavy water in a water reactor.

By employing spectral shift control, not only is it possible to achieve the optimum productive absorption of the excess neutrons within the core, but also to achieve a higher power level, a higher power density and a longer core lifetime.

It is one of the primary objects of this invention to set forth a reactor arrangement in which spectral shift reactor control can be employed. With the use of spectral shift control it is possible to make various modifications in the structure of the reactor core and internals thereby providing a more efficient and economical reactor arrangement.

Another object of this invention is to provide an arrangement for holding the fuel elements in position within the core while reducing the amount of structural material previously required to position the fuel elements.

A still further object of this arrangement is to provide a combination of fuel elements, some having attached hold-down means. These hold-down means in turn provide hold-down for the other fuel elements against the lifting effect of the coolant flowing through the core.

This invention, therefore, is directed to a nuclear reactor which contains a number of longitudinally extending fuel elements arranged in a regular pattern to form a core. The fuel elements fall into two groups, one group comprising fuel elements which contain control rod channels and a second group provided with hold-down means.

The hold-down means are arranged to keep both the hold-down fuel elements and control rod fuel elements in position within the core.

In addition this invention provides a filler casting within the reactor to reduce the heavy water inventory needed to control the reactor.

Further, this invention provides an improved thermal shield construction comprising a number of separate individual sections which can be easily connected together to form an unitary structure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
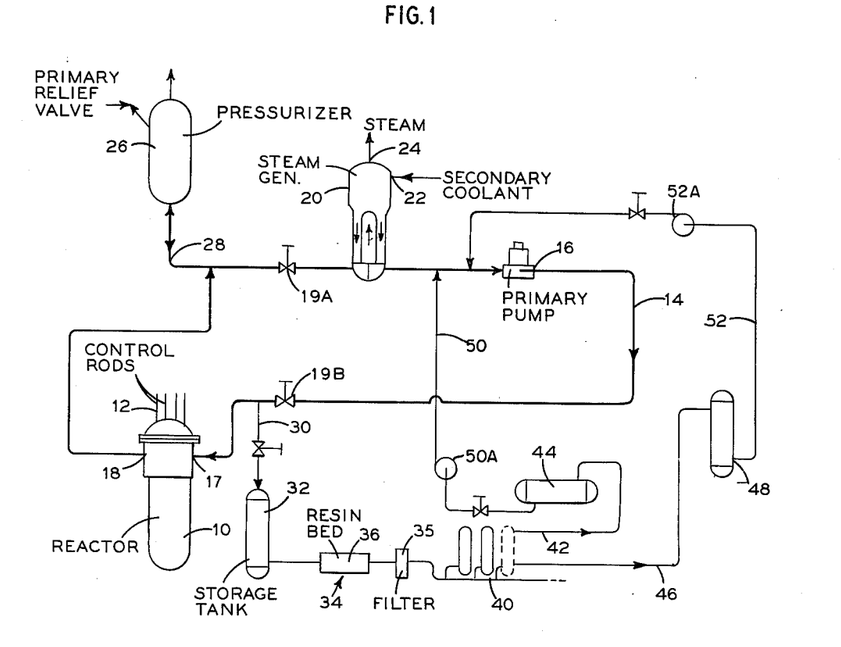
FIG. 1 is a schematic diagram of a reactor plant including a reactor embodying the present invention.

In the drawings FIG. 1 shows a reactor plant incorporating the use of spectral shift control for regulating the fission chain reaction in a reactor 10. For a more complete description of spectral shift control reference is made to the earlier mentioned copending applications of Milton C. Edlund.

Spectral shift control is based on the concept that by varying the slowing-down power of the moderator, only those neutrons required to continue the fission chain reaction are slowed to an energy level at which they will cause another fission. The remaining neutrons are slowed to an energy level at which they will enter fertile material causing its conversion into fissionable material.

In the present invention the moderator comprises a mixture of light and heavy water, and as is well known, heavy water is the poorer moderator of the two from the standpoint of its ability to slow down neutrons. Because the slow-down power of light water is seven times that of heavy water when the heavy water concentration in the moderator goes up, the resonance neutron flux increases and the thermal flux decreases. In other words, the greater the concentration of heavy water, the less likelihood there is that neutrons released in the fission reaction will be slowed down to a thermal energy level. Rather, they will be slowed down to a resonance level at which there is a greater likelihood that they will be absorbed in a fertile material causing its conversion into fissionable material. Therefore, by regulating the quantity of light and heavy water within the reactor, the number of neutrons needed to continue the chain reaction will be slowed to the required energy level and the remaining neutrons will only be slowed to an energy level at which they can be absorbed in fertile material.

In the reactor plant shown in FIG. 1 the fission chain reaction is controlled mainly by a combined moderator are primary coolant comprising a mixture of light and heavy water with top mounted control rods 12 used for scramming the reactor and for fine changes in reactivity. The combined moderator primary coolant is circulated through a primary coolant line 14 by means of a primary pump 16. The coolant enters the reactor through the an inlet 17 and after passing through the core returns into the primary coolant line 14 through outlet 18. Valves 19A, 19B are situated in the line 14 to regulate flow therethrough. After having been heated in its passage through the core, the primary coolant flows into a steam generator 20 wherein it gives up heat to a secondary coolant which enters the steam generator through inlet 22 and after having been vaporized leaves through the outlet 24 for a point of use. From the steam generator 20 the primary coolant returns into the primary coolant line 14 to be recirculated by the primary pump 16. In addition, the reactor plant is provided with a pressurizer 26 connected to the primary coolant line 14 by a conduit 28 which maintains the pressure of the primary coolant at a level so that it will not boil.

To effect spectral shift control of the reactor during the lifetime of the core the ratio of light and heavy water is varied. During the operation a certain amount of the primary coolant is removed through the valved blow-down line 30 to a storage tank 32. When a certain level is reached in the tank 32 the light and heavy water mixture passes into a heavy water recovery system 34 flowing in series through a resin bed 36, a filter 38 and finally a vacuum distillation train 40 which affords a substantial separation of the light and heavy water. From the train 40 a light and heavy water mixture flows through the valved conduit 42 to a product storage tank 44. The mixture supplied to the product storage tank 44 contains about 98% heavy water. A second light and heavy water mixture containing a very low percentage of heavy water in the range of less than 1% passes from the train 40 through a valve conduit 46 to a stripped storage tank 48.

When the ratio of light to heavy water within the primary coolant line needs to be changed a high percentage heavy water mixture can be obtained from the product storage tank 44 through valved inlet line 50 or a low percentage heavy water mixture obtained from the stripped storage tank 48 through valved inlet line 52. Both inlet lines 50, 52 contain pumps 50A, 52A, respectively, for delivering the moderator coolant mixture into the primary system line 14.

Figure 2:
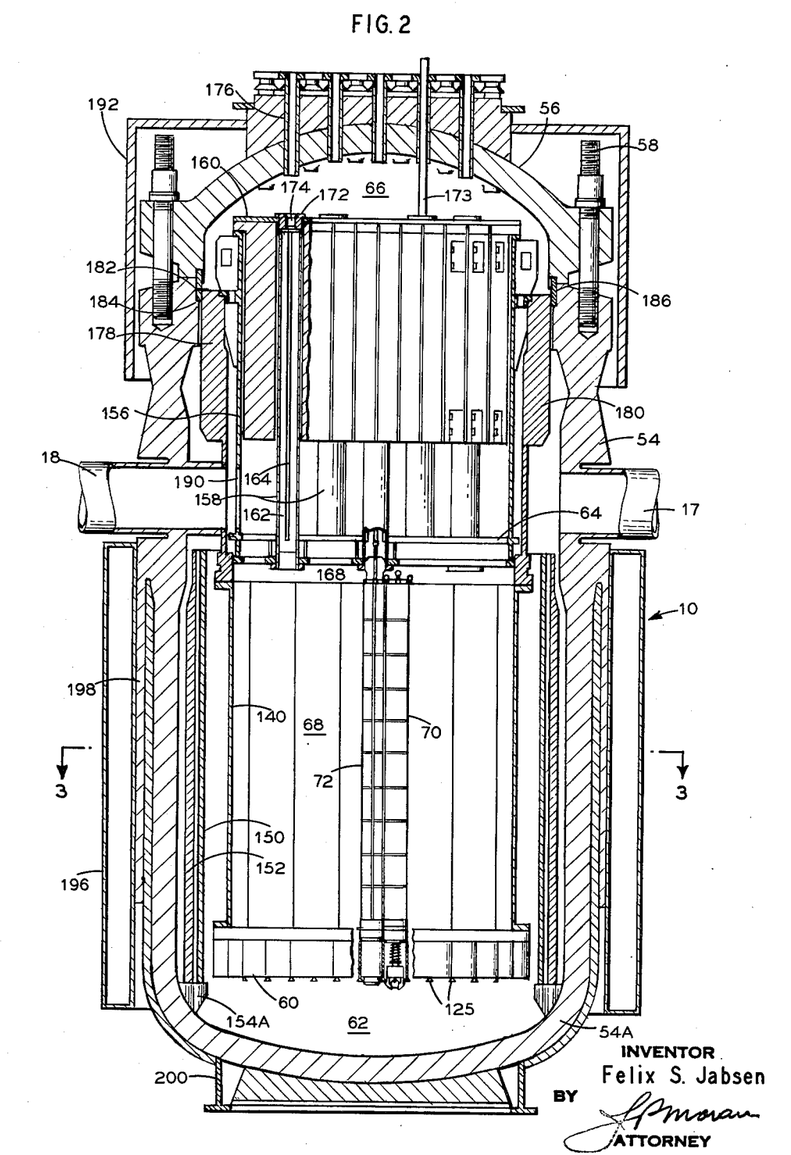
FIG. 2 is a vertical sectional view of the reactor shown in FIG. 1.

The reactor 10 is generally similar to other pressurized water reactor types, however, it has a number of novel features which derive from the use of spectral shift control. The reactor 10 is formed by a vertically extending pressure vessel 54 of circular cross section with an integrally attached lower head 54A and a separate closure member 56 forming its upper head. A number of bolts 58 connect the closure member 56 to the reactor vessel 54.

Within the reactor a horizontally arranged lower grid plate 60 positioned a short distance above the lower head 54A forms in combination therewith a lower plenum chamber 62. Unlike other pressurized water reactors the lower plenum chamber 62 is very shallow since with spectral shift control it is unnecessary to provide room for control rod followers. Above and in parallel relationship with the lower grid plate 60 is an upper grid plate 64 which is located approximately at the vertical mid-height of the vessel. The upper grid plate 64 in combination with the pressure vessel 54 and the closure member 56 forms an upper plenum chamber 66.

The active fuel region or core 68 of the reactor is located between the lower and upper grid plates 60 and 64, respectively. The core is made up of a combination of vertically extending hold-down fuel element assemblies 70 and control rod fuel element assemblies 72 arranged in a regular alternating pattern, see FIG. 3. Each of the control rod fuel elements 72 are formed so that a control rod 73 can pass through it. As will be noted the core is arranged to provide, as nearly as possible, a circular cross section so that a number of hold-down fuel elements 74 of reduced size are located at the quarter points about the periphery of the core.

Figure 6:
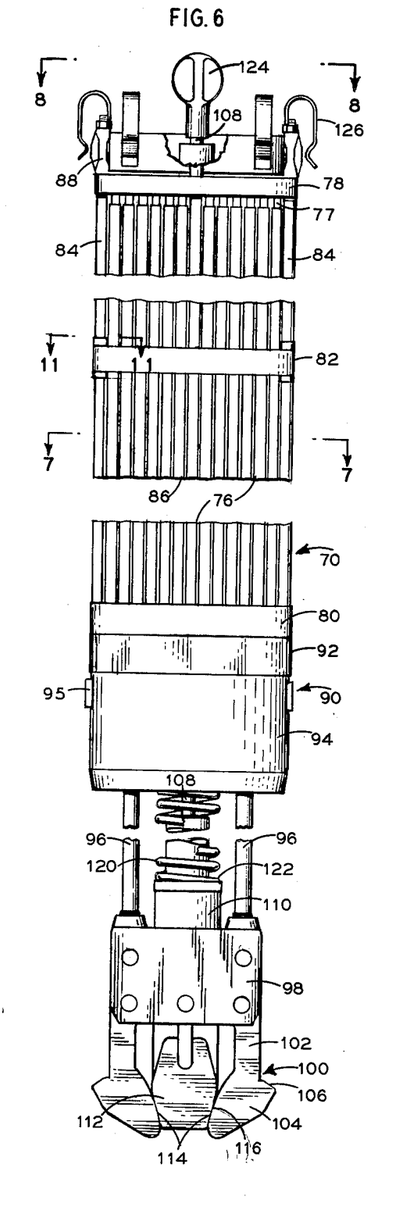
FIG. 6 is an enlarged partial longitudinal view of one of the hold-down fuel elements in the reactor of FIG. 2.
Figure 7:
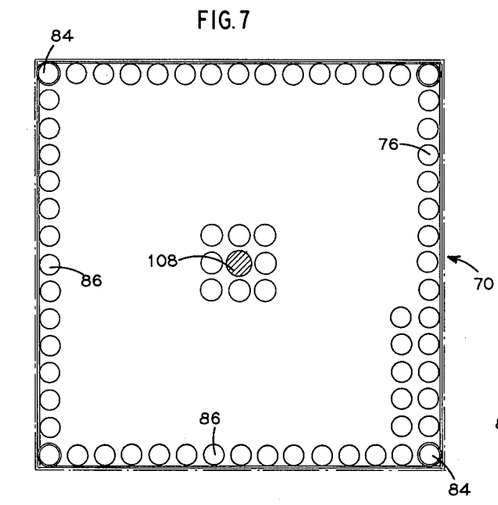
FIG. 7 is an enlarged transverse section of the hold-down fuel element taken along line 7—7 in FIG. 6 and showing only a portion of the fuel components.
Figure 9:
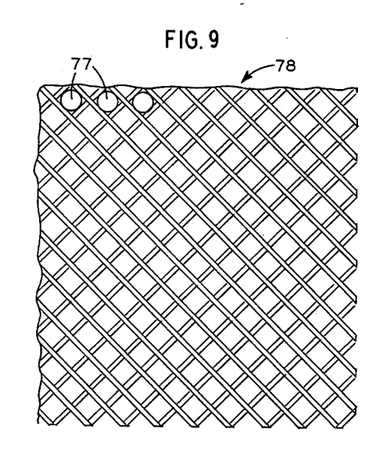
FIG. 9 is a top view of a portion of the top grid of the hold-down fuel element shown in FIG. 6 with several fuel components illustrated positioned therein.
Figure 10:
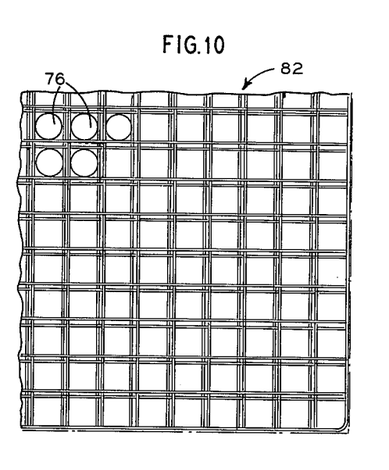
FIG. 10 is a top view of a portion of one of the intermediate spacer grids of the hold-down fuel element of FIG. 6 with several fuel components illustrated therein.

The hold-down fuel elements 70 comprise a number of longitudinally extending fuel components 76 in the form of fuel pins or rods of circular cross section. These components 76 contain the fissionable fuel within elongated sealed tubes of cladding material. At each end 77 the components 76 have a reduced cross section which fits into a top grid 78 and a bottom grid 80. The bottom grid 80 is of a similar, though somewhat deeper, egg-crate construction to that of the top grid 78 which is shown in FIG. 9. In addition, at evenly spaced positions between the ends of the fuel components 76 intermediate grids 82 are provided to supply lateral spacing and support for the fuel components. These intermediate grids are also of a generally egg-crate type construction as illustrated in FIG. 10.

Figure 11:
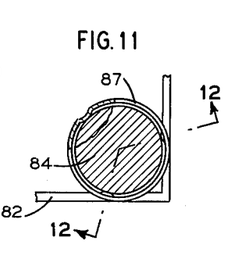
FIG. 11 is an enlarged transverse view partially in section of one of the corner fuel pins of the hold-down fuel element with one of its dimpled spacer ferrules taken along line 11—11 in FIG. 6.
Figure 12:
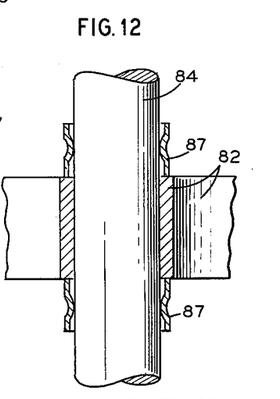
FIG. 12 is a sectional view of the corner fuel pin and its dimpled spacer ferrules taken along line 12—12 in FIG. 11.

At the four corners of the hold-down fuel elements 70, corner fuel components 84 are positioned having the fuel contained within a tubing of heavier construction than that of fuel components 76. In addition to the corner fuel components 84, middle fuel components 86 located in each of the peripheral rows of fuel components have tubing of a heavier construction though not to the same extent as the corner fuel components. The corner and middle fuel components 84 and 86, respectively provide support for the fuel element. Dimpled ferrules 87 are arranged on the corner fuel components 84 where they pass through the intermediate grids 82 to hold the intermediate grids in position at the corners of the fuel element. As shown in FIGS. 11 and 12 the dimpled ferrules 87 are located about the corner fuel components 84 above and below the intermediate grids 82. The ferrules 87 are dimpled at the third points about their periphery to provide a close fit with the corner fuel components 84.

Immediately above the top grid 78, a top casting 83 is located into which the corner fuel components 84 and the middle fuel components 86 are threaded to secure the casting to the fuel element. While the fuel components 76 within the fuel bundle extend only into the top grid 78, the corner fuel components 84 and the middle fuel components 86 extend upwardly through the top grid into the top casting 88. In similar fashion, these corner and middle fuel components also extend through the bottom grid 80 and are secured within a hold-down transition section 90 which is positioned immediately subjacent the bottom grid. The transition section 90 comprises an upper rectangular portion 92 and a lower cylindrical portion 94 which extends axially downward from the hold-down fuel element. Indexing members 95 are located about the exterior of the cylindrical portion 94 for locating the hold-down fuel element within the reactor. The cylindrical portion 94 of the transition section 90 fits into the lower grid plate 60.

A pair of support members 96 are connected at their upper ends to the transition section 90 and extend downwardly therefrom in alignment with the hold-down fuel element 70. Attached to the lower ends of the support members 96, are a pair of vertically extending spaced plates 98. A pair of oppositely disposed latch arms 100 are connected at their upper ends between the plates 98 and extend downwardly in general alignment with the support members 96. These latch arms 100 are pivotally connected to the plates 98 for movement in a direction transverse to the longitudinal axis of the fuel element. Each latch arm comprises an upper section 102 which is pin connected to the plates 98 and a generally triangular shaped lower section 104 with one edge extending transversely out from the latch arm away from the axis of the hold-down fuel element forming a shoulder 106. There is no center fuel component within the fuel element, in its place there is a handling shaft 108 which extends from the top casting 88 down through the fuel element to a point below the transition section 90. At its lower end, the handling shaft 108 is threaded into a plunger 110 which extends axially therefrom terminating in a wedge shaped member 112 positioned between and in contact with the lower sections 104 of the latch arms 100. The wedge shaped member 112 has a pair of opposite surfaces 114 which contact corresponding surfaces 116 on the lower sections 104 of the latch arms 100. The surfaces 114 of the wedge shaped member 112 diverge upwardly from the bottom edge of the plunger 110.

The handling shaft 108 extends through an opening 117 in the transition section 90 and a spring retainer plate 118 forms a part of the transition section located at the lower end of the opening through which the handling shaft passes. A helically coiled spring 120 is disposed about the handling shaft bearing against the spring retainer plate 118 at its upper end and against the top face 122 of the plunger 110 at its lower end. At its upper end a lifting knob 124 is attached to the handling shaft 108 and extends above the top casting 88.

In its normal position, the spring 120 forces the plunger 110 and its wedge shaped member 112 downwardly with the surfaces 114 pushing outwardly against the corresponding surfaces 116 of the latch arms 100. This outward force causes the latch arms to pivot about the pins in the plates 98 and move transversely outwardly so that the shoulders 106 are in a horizontal plane bearing upwardly against support shoes 125 located on the lower face of the lower grid plate 60.

Figure 8:
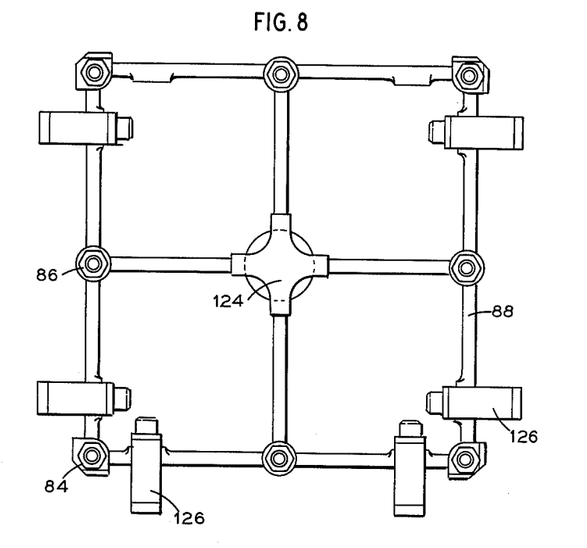
FIG. 8 is a top view of the hold-down fuel element taken along line 8—8 of FIG. 6.

About the edges of the top casting 88 are a number of spring clips 126 which connect the hold-down fuel elements 70 to the adjacent control rod fuel elements 72. As shown in FIG. 8, there are two spring clips 126 along three sides of the top casting 88. The interior hold-down fuel elements 79 within the core have spring clips 126 on all four sides, however, certain of the hold-down fuel elements about the periphery of the core do not have control rod fuel elements on each side so that they have spring clips 126 located only along the sides adjacent control rod fuel elements.

Figure 13:
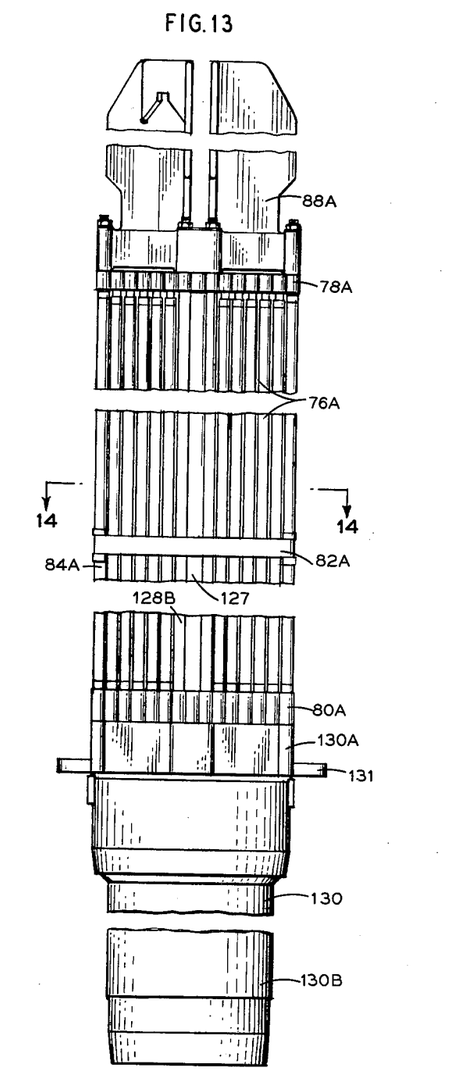
FIG. 13 is an enlarged partial longitudinal view of one of the control rod fuel elements in the reactor in FIG. 2.
Figure 14:
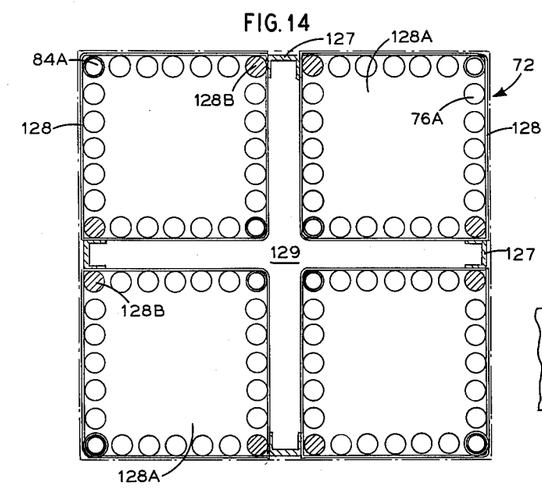
FIG. 14 is an enlarged transverse section of the control rod fuel element taken along line 14—14 in FIG. 13 showing only a portion of the fuel components.

The control rod fuel elements 72 have the same general construction of fuel components 76A as well as similar top, bottom and intermediate grids 78A, 80A and 82A, respectively, as those in the hold-down fuel element 70. However, vertically extending channels 127 and transversely arranged straps 128 serve to divide the control rod fuel element 72 into four quarter bundles 128A of fuel components 76A and to form a cruciform shaped control rod channel 129 passing longitudinally through the fuel element. The four corner components 84A of the fuel element are also similar to those in the hold-down fuel elements 70, they extend upwardly through the top grid being connected into a top casting 88A which is arranged to permit the passage therethrough of a control rod 73. Since the control rod channel 129 does away with the middle fuel components 86 of the hold-down fuel elements 70, in place thereof the quarter bundles 128A have inner corner fuel components 128B located in the peripheral rows of the control rod fuel element. These inner corner fuel components 128B are of heavier tubular construction than the fuel components 76A and are also fitted into the top casting 88A providing in combination with the corner fuel components 84A support for the control rod fuel elements 72. When assembled within the core, the top castings 88A of the control rod fuel elements 72 are attached to the adjacent top castings 88 of hold-down fuel elements by means of the spring clips 126. However, while the hold-down and control rod fuel elements are generally similar above the bottom grid 80 and 80A, respectively, the portion of the control rod fuel element which fits into the lower grid plate 60 is quite different.

Figure 15:
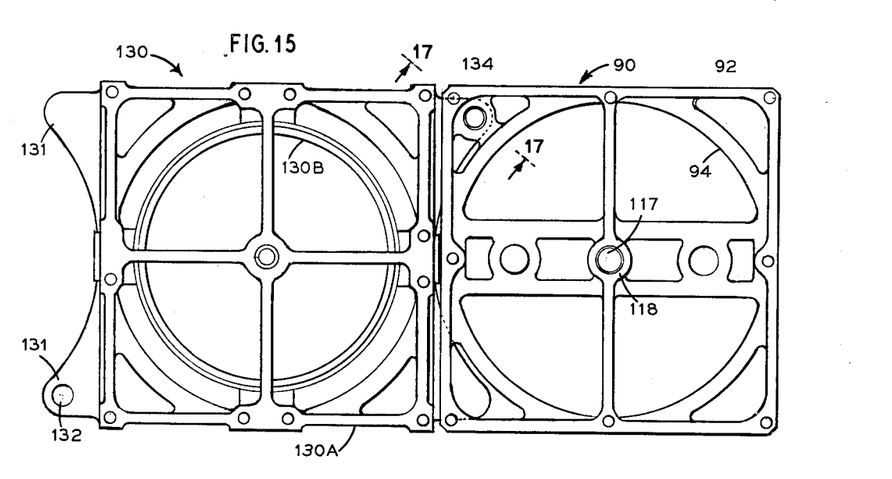
FIG. 15 is a top view of the control rod fuel element transition section and the hold-down fuel element transition section shown in assembled relationship.
Figures 16, 17:
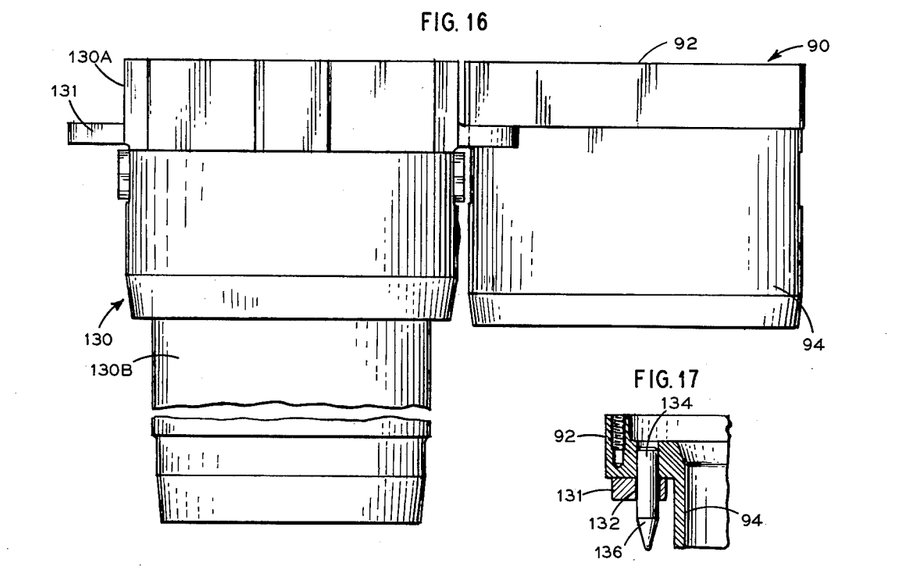
FIG. 16 is a partial side view of the control rod fuel element and hold-down fuel element transition sections of FIG. 15.
FIG. 17 is a sectional view taken along line 17—17 of FIG. 15 illustrating the dowel pin connection of the control rod fuel element transition section to the hold-down fuel element transition section.

Below the bottom grid 80A, a transition section 130 is connected to the control rod fuel element by means of the corner fuel components 84A and inner corner fuel components 128B which extend through the bottom grid into corresponding openings in the transition section. This transition section 130 has an upper portion 130A of rectangular section and a lower cylindrical section 130B which fits into the lower grid plate 60 with its bottom edge extending below the support shoes 125 on the lower face of the lower grid plate. On the outer surface of the upper portion 130A of the transition section above the lower grid plate 60, a pair of flat lugs 131 extend in a horizontal plane from two opposed sides of the transition section to a point aligned below the adjacent hold-down fuel elements, see FIGS. 15, 16 and 17. One of the lugs 131 is provided with a dowel hole 132. The corresponding upper portion 92 of the transition section 90 of the hold-down fuel elements fits over the lugs 131 and a corresponding dowel hole 134 is provided in the hold-down transition section in alignment with the dowel holde 132 in the lug 131. The two transition sections are pinned together by means of a dowel pin 136 which extends through the corresponding dowel holes 132 and 134.

Since the hold-down fuel elements 70 fit over the lugs 131 of the adjacent control rod fuel element transition sections, each hold-down fuel element is able, in turn, to hold down two adjacent control rod fuel elements.

As described earlier, there are a number of reduced size hold-down fuel element assemblies 74 located about the periphery of the core. While these reduced size hold-down assemblies have their own latching members similar to the hold-down fuel elements 70 for engagement with the lower grid plate 60, only those which have a side in contact with a control rod fuel element 72 provides hold-down for an adjacent fuel element.

Figure 4:
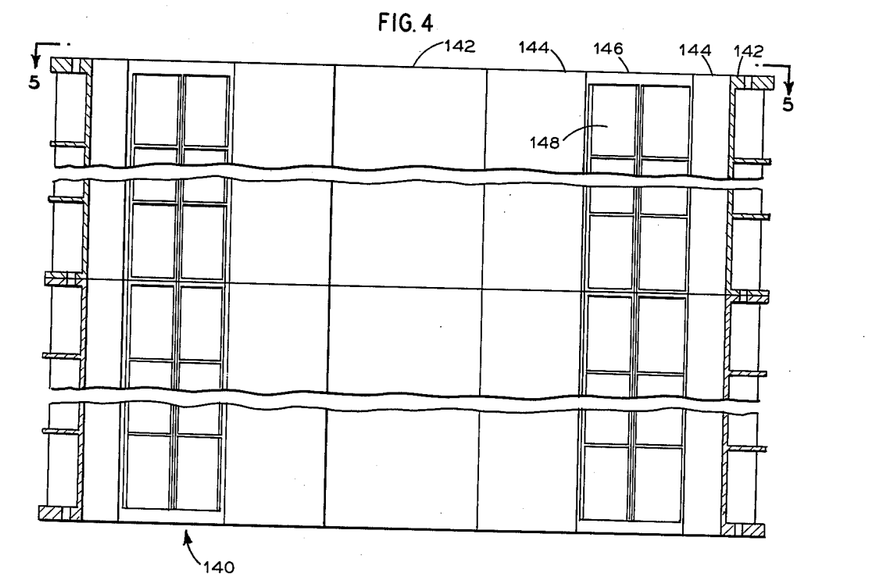
FIG. 4 is a partial vertical view of the inner thermal shield shown in FIGS. 2 and 3.
Figure 5:
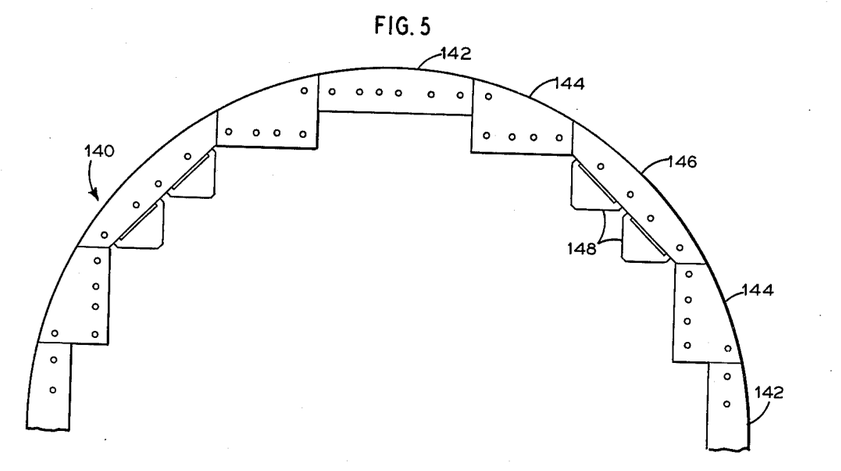
FIG. 5 is a top view of the inner thermal shield taken along line 5—5 in FIG. 4.

Extending about the core in contiguous relationship with the peripheral full size and reduced size hold-down fuel elements 70, 74 respectively, is an inner thermal shield 140. This inner thermal shield 140 is made up of a plurality of vertically extending similarly shaped castings 142, 144 and 146 which are bolted together to provide a substantially cylindrical structure. The castings 142 and 144 contact the immediately adjacent reduced size and full size hold-down fuel element assemblies while the casting 146 has a pair of filler blocks 148 extending vertically along its surface to fill the space between the casting and the adjacent full size hold-down fuel elements.

This inner thermal shield 140 has the advantage that it can be built up from a number of individual castings to provide a mechanically assembled unit which can be constructed to very close tolerances without the difficulties involved in providing a single integral cylindrical member as the thermal shield.

Spaced radially outwardly from the inner thermal shield 140 is a pair of concentrically arranged vertically extending cylinders 150, 152 which act as the outer thermal shields between the core 68 and the vessel 54. These outer thermal shields 150, 152 extend downwardly from a horizontal plane which passes through the upper grid plate 64 to a horizontal plane passing immediately below the lower grid plate 60. Support brackets 154 are attached to the inner wall of the pressure vessel 54 at its quarter points to support the outer thermal shields 150, 152.

Within the vessel 54, an upper plenum chamber cylinder 156 is supported about its lower edge on the upper grid plate 64 and extends upwardly to a transverse plane above the closure joint between the vessel and the closure head 56. The upper plenum chamber cylinder 156 encloses a number of control rod guide tubes 158 which are positioned above and in alignment with the control rod channels 129 in the control rod fuel elements 72. These control rod guide tubes 158 have their lower ends fitted into the upper grid plate 64 and their upper ends fitted into a plate 160 which extends transversely across the top of the upper plenum chamber cylinder 156. Within the control rod guide tubes 158, a number of triangular shaped spacer blocks 162 form cruciform shaped channels 164 for the passage of the control rods 73. At its lower end the control rod guide tube 158 is connected to a sleeve 168 which in turn is attached to the upper grid plate 64 and is positioned immediately above the top casting 88A. At its upper end a bushing 172 forms a closure for the control rod guide tube 158. The bushing 172 has a central opening 174 for the passage of the control rod drive shaft 173 into the guide tube. Directly above the guide tubes 158 in the closure head 56 are the control rod drive nozzles 176 through which the control rod drive shafts pass for positioning the control rods in the control rod guide tubes 158 and the control rod channels 129 in the control rod fuel elements 72.

Within the upper plenum chamber cylinder, a filler casting 178 extends downwardly from the plate 160 for approximately two-thirds of the height of the cylinder. This filler casting 178 comprises a number of individual sections bolted together to reduce the open volume within the cylinder 156 and about the control rod guide tubes 158. By reducing this volumn, the quantity of coolant required within the reactor is reduced which results in the reduction in the inventory of heavy water required for reactor operation.

Positioned exteriorly of the upper plenum chamber cylinder 156 is a support assembly 180 which extends downwardly from a horizontal plane closely spaced below the closure joint of the vessel to the top of the inner thermal shield 140. This support assembly has fingers 182 extending radially outwardly about its upper edge which are supported on a lip 184 formed by a recess 186 running around the inner face of the pressure vessel. A ring 188 is arranged within the recess 186 fitting over the fingers 182 to hold them in place. The outlet nozzle 18 passes through both the vessel wall 54 and the support assembly 180. Additionally, openings 190 are formed in the lower end of the upper plenum chamber cylinder 156 to permit coolant to flow from the cylinder to the outlet 18.

Insulation 192 is arranged about the exterior of the pressure vessel. Additionally, an annular shaped tank 196 extends about the periphery of the vessel covering the area generally opposite the core 68. The tank when filled with light water acts as a neutron shield about the exterior of the reactor. The tank 196 is connected to a sleeve 198 which is an integral part of the vessel 54, and acts as the support for the reactor. The support structure 200 located on the outside of the lower head is used only in erecting the reactor and does not provide reactor support once construction is complete.

The moderator coolant comprising a mixture of light and heavy water enters the reactor 10 through the inlet 17 and flows downwardly between the thermal shields and the walls of the pressure vessel to the lower plenum chamber 62. From the lower plenum chamber, the coolant flows upwardly through the core 68 passing over the fuel components in both the hold-down and control rod fuel elements 70, 72, respectively removing the heat generated in the fission chain reaction and providing the necessary moderation or slowing-down power to control the reactor by making the excess neutrons available for conversion of fertile to fissionable material.

After its passage through the core 68, the coolant passes upwardly through the upper grid plate 64 into the upper plenum chamber cylinder 156 from whence most of the coolant passes through the openings 190 to the outlet 18. A certain amount of coolant from the core enters the control rod guide tubes 158 passing upwardly therethrough and then out through the openings 174 in the bushing 172 into the space above the plate 160. From the space about the plate, the coolant then flows downwardly outside the upper plenum chamber cylinder 156 leaving the reactor through the outlet 18.

Figure 3:
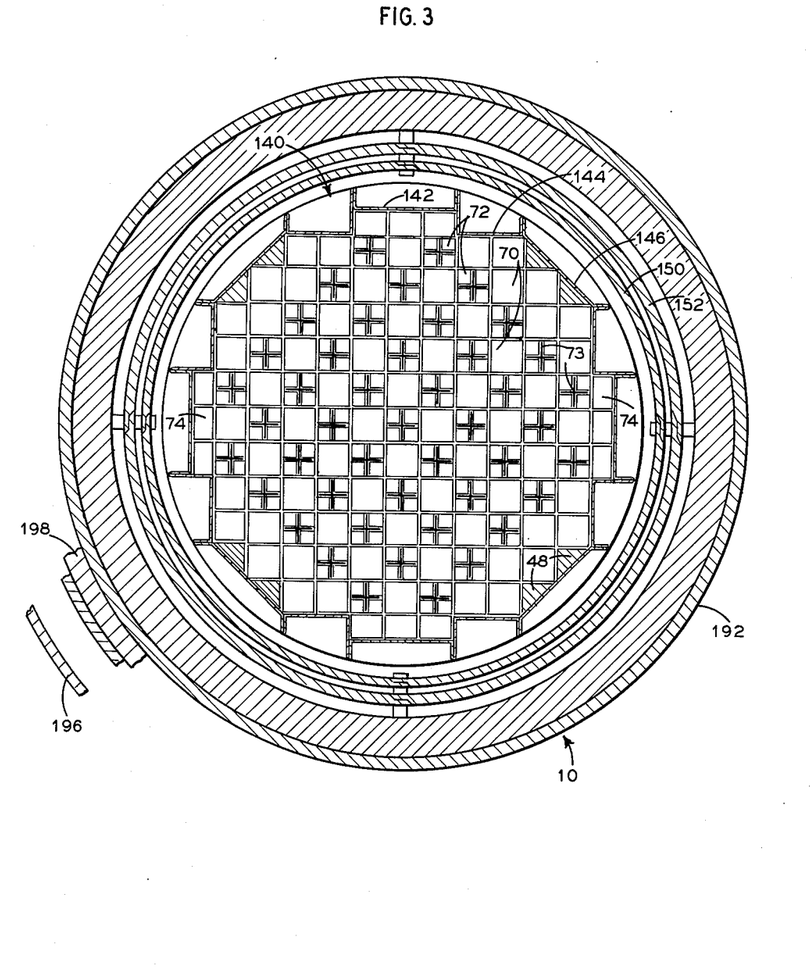
FIG. 3 is an enlarged partial horizontal section of the reactor in FIG. 2 taken along line 3—3.

As can be noted in FIG. 3, there are 45 control rod fuel elements within the core. The majority of these control rods are utilized for scram action since they offer a more positive rapid, convenient and economical means to rapidly introduce negative reactivity into the reactor rather than attempting to shut down the reactor by varying the light and heavy water content of the coolant. Since most of these rods are removed from the core during operation, they do not affect the high neutron efficiencies obtained by utilizing spectral shift control. Though most of the control rods are removed from the core during operation, a small number of regulating rods are used to balance the reactivity effects of heating the system from room temperature to operating temperature and to balance reactivity effects due to changes in fuel temperature which occur during load changes. For a clearer understanding of the control means used in this reactor, the following description of operation during start-up and during normal operation is provided.

With the core 68 fully loaded with both hold-down and control rod fuel elements, and with all the control rods 73 inserted for their full length within the control rod fuel elements, start-up operation is begun with a mixture of about 70% heavy water and 30% light water in the primary coolant system. First, pressurization is commenced and the primary pumps are started up. The pump 16 supplies the heat needed to bring the coolant to start-up temperature while at the same time it is being brought to the required pressure by the pressurizer 26. Next, all but twelve of the control rods are removed from the core, with the remaining control rods still fully inserted within the control rod fuel elements 72. At this point, the heavy water concentration is changed by adding light water with a minimum heavy water content and removing the remaining control rods until criticality is achieved at some uniform rod position. Next, the twelve control rods are fully inserted into the core maintaining criticality by the proper adjustment of the light and heavy water mixture. The core is then brought to full power by completely withdrawing eight of the control rods leaving the remaining four so that they are inserted for 50% of their length. The core is now ready for normal operation.

In the course of normal operation reactivity control is achieved by a combination of control rods and spectral shift control. Since only four control rods are used, the bulk of the control is attained by the mixture of light and heavy water which keeps power peaking to a minimum thereby permitting higher average power output from the core.

During normal operation the movement of the four control rods in the core ranges from a half to a quarter insertion. Fine regulation of reactivity is attained by withdrawing the four control rods from their position of half to quarter insertion within the core. When the control rods have been withdrawn so that only a quarter of their length remains within the core, a broad adjustment in reactivity control is made by changing the ratio of light to heavy water in the moderator-coolant, and reinserting the four control rods back into the core for half their length. Under normal operating conditions the amount of heavy water in the moderator is gradually reduced to compensate for fission product build-up and fuel depletion. By operating in this manner, it is not necessary to continuously vary the mixture of light and heavy water since the control rods take care of slight changes in reactivity.

When it becomes necessary to shut down the reactor the four control rods within the core plus the others which have been withdrawn are fully inserted back into the core to shut down the fission chain reaction.

As previously mentioned, the concentration of the coolant mixture is varied only at regular intervals, however, a small amount of the coolant is continuously blown down into the storage tank 32. At the same time, a substantially equal amount is returned to the primary coolant system through the seals in the pumps and valves balancing the amount blown down. When the coolant is required to be varied, a predetermined amount is withdrawn into the storage tank 32 from whence it passes into the heavy water separation system 34 with a mixture of approximately 98% water passing to the product storage tank and a mixture containing less than 1% heavy water passing into the stripped storage tank. Ordinarily, during operation only the light and heavy water mixture from the stripped storage tank is reinserted into the primary coolant line to reduce the concentration of heavy water and thereby increase the slowing-down power of the moderator coolant.

By combining the use of spectral shift control with conventional control rods, it is possible to obtain a much higher core power density than is available where only conventional control rods are used. Though it is possible to operate without them, the control rods are used to simplify operation and to assure maximum safety.

Additionally, the arrangement of fuel elements within the reactor provides means whereby all of the elements can be held in place without requiring considerable amounts of structural material for their hold-down.

It will be understood by those experienced in the art that if the core in the present invention is zone loaded, either or both radially and axially, that an improved power density will be available from the reactor. While the invention is described in a pressurized water reactor, it will be realized that it is also applicable to boiling water reactors and other types in which spectral shift control can be embodied.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a nuclear reactor a core made up of a number of elongated first and second fuel elements each comprising a multiplicity of fuel containing components, each of said first and second fuel elements having a coolant inlet at one end and a coolant outlet at the opposite end for the passage of a coolant through said elements in heat tranfer relationship with said fuel components, a grid plate disposed within said reactor and arranged to receive the inlet ends of said fuel elements, hold-down assemblies attached to said first fuel elements for securing said first fuel elements in place within said reactor, each of said hold-down assemblies comprising a pair of latch arms extending longitudinally axially from one of said first fuel elements and movably positionable in a direction transverse to the longitudinal axis of said first fuel element, support means connected at one end to the inlet ends of said first fuel elements and at the opposite end having said latch arms pivotally connected thereto, a spring loaded actuating member disposed between and in contact with said latch arms and biased for urging said latch arms into engagement with said grip plate, a shaft connected to said spring loaded member for depressing said spring and releasing said latch arms from engagement with said grid plate, and means attached to said second fuel elements and arranged in combination with said hold-down assemblies of said first fuel elements for holding said second fuel elements in place within said reactor.

2. In a nuclear reactor a core made up of a number of elongated first and second fuel elements each comprising a multiplicity of fuel containing components, each of said first and second fuel elements having a coolant inlet at one end and a coolant outlet at the opposite end for the passage of a coolant through said elements in heat transfer relationship with said fuel components, a grid plate disposed within said reactor and arranged to receive the inlet ends of said fuel elements, hold-down assemblies attached to said first fuel elements for securing said first fuel elements in place within said reactor, each of said hold-down assemblies comprising a transition section attached to and extending axially from the inlet end of each of said first fuel elements, support means connected to said transition section and extending axially therefrom, a pair of latch arms pivotally connected to said support means and extending axially away from said first fuel element, a handling shaft extending through said first fuel element and transition section, actuating member connected to said handling shaft and disposed between and in contact with said latch arms, and spring means in combination with said transition section and actuating member for urging said latch arms into engagement with said grid plate, said shaft arranged whereby an axial lifting force thereon away from said actuating member depresses said spring means and releases said latch arms from engagement with said grid plate, spring clips fitting over the outlet ends of said first and second fuel elements for linking said fuel elements together, and means connected to said second fuel elements and arranged in combination with said hold-down assemblies of said first fuel elements for holding said second fuel elements in place within said reactor.

3. A fuel element for use in a nuclear reactor comprising a pair of egg-crate type end grids disposed in spaced parallel relationship, a number of intermediate grids spaced at intervals between and in parallel and aligned relationship with said end grids, a bundle of elongated fuel rods of circular cross section secured within and extending between said end grids and passing through said intermediate grids in closely fitting relationship therewith, a support frame disposed at one end of said fuel element contiguous with one of said end grids, a hold-down transition section positioned at the opposite end of said fuel element contiguous to the other end grid, a number of connecting fuel rods located on the periphery of said bundle, said connecting fuel rods extending through said end grids and being secured at one end within said support frame and at the opposite end within said transition section, support members attached to said transition section and extending therefrom in the direction of the longitudinal axis of said fuel element, a pair of spaced parallel plates connected to the ends of said support members remote from said transition section, a pair of similarly shaped oppositely arranged movably positionable latch arms pivotly attached to said plates and extending therefrom in the general axial direction of said fuel elements, a handling shaft extending centrally through said fuel element from said retaining frame at one end to and through said transition section at the opposite end, a lifting knob connected to said handling shaft at the retaining frame end thereof, an axially movable latch arm actuating member attached to said handling shaft at the transition section end thereof, said actuating member having a pair of oppositely disposed surfaces arranged in contact with said latch arms whereby axial movement of said actuating member is translated into transverse movement of said latch arms, and spring means in combination with said transition section and actuating member for biasing said actuating member into an extended position whereby said latch arms are in a latching position, and in turn a lifting force on said lifting knob in an axial direction away from said fuel element depresses said spring means moving the actuating member upwardly whereby the latch arms pivot inwardly being released from their latching position.

4. In a nuclear reactor a core comprising a number of longitudinally extending hold-down fuel elements and a number of control rod fuel elements arranged in a regular alternating arrangement wherein each of said hold-down fuel elements is positioned between at least a pair of said control rod fuel elements, each of said hold-down fuel elements and control rod fuel elements having an inlet end and an outlet end for the passage of coolant therethrough, a transversely arranged grid plate positioned in said reactor at the inlet ends of said fuel elements, a transition section attached to the inlet end of each of said control rod fuel elements and fitted into said grid plate, a flat lug extending from said transition section in a plane transverse to the longitudinal axes of said fuel elements to a point aligned with said adjacent hold-down fuel element, said lug having a dowel hole located therein, a hold-down transition section attached to the inlet end of each of said hold-down fuel elements and fitted into said grid plate whereby a portion of said hold-down transition section fits over said lug on said transition section, said hold-down transition section having a dowel hole therein in alignment with the dowel hole in said lug, a dowel extending through the aligned dowel holes in said transition sections, movably positionable latching means connected to said hold-down transition section and extending through said grid plate, means for urging said latching means into engagement with said grid plate whereby the hold-down fuel elements are secured within the reactor against the flow of coolant passing through said fuel elements and each of said hold-down fuel elements in turn hold down at least one of its said adjacent control rod fuel elements against the flow of the coolant.

5. In a nuclear reactor a core comprising a number of vertically extending hold-down fuel elements and a number of vertically extending control rod fuel elements all having substantially the same exterior shape in horizontal section, and arranged in a regular pattern to form a number of transversely extending rows wherein in each row of said hold-down fuel elements is positioned between a pair of said control rod fuel elements and in adjoining rows each hold-down fuel element is positioned adjacent to one of said control rod fuel elements, a horizontally arranged grid plate positioned in said reactor below said core, a transition section attached to the lower end of each of said control rod fuel elements and fitted into said grid plate, flat lugs extending in a horizontal plane from opposite sides of said transition section, said lugs aligned below the adjacent hold-down fuel element and having vertically arranged dowel holes located therein, a hold-down transition section attached to the lower end of each of said hold-down fuel elements and fitted into said grid plate, a portion of said hold-down transition section fitting over said lugs on the transition section of said control rod fuel element, said hold-down transition section having a dowel hole therein above and in alignment with the dowel hole in said lugs, a dowel extending through said aligned dowel holes in said control rod fuel element and hold-down fuel element transition sections, generally vertically depending movably positionable latching means connected to said hold-down transition section and extending below said grid plate, means for urging said latching means into engagement with said grid plate whereby the hold-down fuel elements are secured within the reactor against flow of coolant passing upwardly through the fuel elements and each of said hold-down fuel elements in turn holds down at least one of its said adjacent control rod fuel elements against the upward flow of coolant.

6. A nuclear reactor comprising a vertically extending pressure vessel open at the top, an upper head connected to said pressure vessel at the top thereof and forming a closure therefor, a horizontally arranged upper grid plate positioned within said reactor, a lower grid plate located below and in parallel relationship with said upper grid plate, a number of vertically elongated fuel elements forming a core positioned between said upper and lower grid plates, each of said fuel elements having a coolant inlet at the lower end and a coolant outlet at the upper end thereof, said fuel elements arranged with the inlet ends thereof fitted into said lower grid plates and the upper ends thereof linked together by individual connectors, hold-down assemblies connected to at least some of said fuel elements at the inlet ends thereof, each of said hold-down assemblies comprising latching members and means in combination therewith for urging said latching members into engagement with said lower grid plate so that the fuel element assemblies are held in place against the flow of coolant passing upwardly through the core, thermal shield means comprising a number of vertically extending castings connected together to form a thermal shield positioned contiguous to the lateral periphery of said core, the radially inner surface of said castings shaped to register with the outer surfaces of said fuel elements located at the periphery of said core, a coolant inlet to and a coolant outlet from said pressure vessel both positioned in substantially the same horizontal plane above said core, a support member supported by and extending downwardly from said pressure vessel, an upper plenum assembly supported by said support member, said plenum assembly comprising a number of vertically extending control rod guide tubes having the lower ends thereof positioned within said upper grid plate, an upper plenum chamber cylinder extending upwardly from said upper grid plate and encircling said guide tubes, and a filler casting located within and filling a majority of the volume within said upper plenum chamber cylinder about said guide tubes, a number of movable positionable vertically arranged control rods disposed within said reactor, and control rod drive means for positioning said control rods between said core and control rod guide tubes.

7. A nuclear reactor comprising a vertically extending pressure vessel of circular cross section open at the top and closed at the bottom by an integrally attached lower head, an upper head connected to said pressure vessel and forming a closure therefor, a horizontally arranged upper grid plate positioned within said reactor at approximately its mid-height, said upper grid plate forming in combination with said pressure vessel and upper head an upper plenum chamber, a lower grid plate located below and in parallel relationship with said upper grid plate and closely spaced above said lower head and forming in combination therewith a lower plenum chamber, a number of vertically elongated fuel elements forming a core positioned between said upper and lower grid plates, each of said fuel elements having a coolant inlet at the lower end and a coolant outlet at the upper end thereof, said fuel elements arranged with the inlet ends thereof fitted into said lower grid plates and the upper ends thereof closely spaced below said upper grid plates, spacer clips arranged to fit over and position the upper ends of adjacent fuel elements, hold-down assemblies connected to at least some of said fuel elements at the inlet ends thereof, each of said hold-down assemblies comprising latching members and means in combination therewith for urging said latching members into engagement with said lower grid plate so that said fuel elements are held in place against the flow of coolant passing upwardly through the core from the lower plenum chamber, a pair of spaced vertically disposed concentrically arranged right circular cylinders forming outer thermal shields laterally encircling said core within said pressure vessel, support means attached to the interior of said pressure vessel below said core to support said cylinders, a number of vertically extending castings connected together to form an inner thermal shield positioned inwardly from said cylinders and disposed contiguous to the lateral periphery of said core, the radially inner surface of said castings shaped to register with the outer surfaces of said fuel elements located at the periphery of said core, ribs extending radially outwardly from said castings and having openings therethrough to permit the downward flow of coolant therethrough, a coolant inlet to and a coolant outlet from said pressure vessel both positioned in substantially the same horizontal plane above said core, a recess formed in the interior of said pressure vessel at the closure thereof, a support member supported by and extending downwardly from said recess, an upper plenum chamber assembly supported by said support member, said upper plenum chamber assembly located above said core and comprising a horizontally arranged top plate located above said closure, a number of vertically extending control rod guide tubes having the lower ends thereof positioned within said upper grid plate and the upper ends thereof fitted into said top plate, an upper plenum chamber cylinder extending upwardly from said upper grid plate to said top plate encircling said guide tubes and having openings in its sides for the passage of coolant therethrough, and a filler casting located within said upper plenum chamber cylinder about said guide tubes and extending downwardly from said top plate filling a majority of the volume disposed about said guide tubes within said upper plenum chamber cylinder, a number of movable positionable vertically arranged control rods disposed within said reactor, and control rod drive means for positioning said control rods between said core and said control rod guide tubes in said upper plenum chamber.

8. In a nuclear reactor a core made up of a number of elongated fuel elements each comprising a multiplicity of fuel containing components, each of said fuel elements having a coolant inlet end and an oppositely disposed coolant outlet end and arranged for the passage of a coolant through said element in heat transfer relationship with said feul components, fuel element support means disposed within said reactor reactor adjacent the coolant inlet ends of said elements for supporting said fuel elements, and hold-down assemblies attached to and dependently supported from at least some of said fuel elements at the inlet ends thereof for securing said fuel elements in place within said reactor against the flow of coolant passing from the inlet end to the outlet end of said fuel elements, each of said hold-down assemblies comprising movably positionably latching means, and actuating rod means in combination with each of the fuel elements having hold-down assemblies attached thereto for urging said latching means into engagement with said support means for securing said fuel elements against displacement by the flow of coolant.

References Cited by the Examiner
FOREIGN PATENTS 854,882 11/60 Great Britain.
347,526 8/59 Japan.

OTHER REFERENCES

German printed application No. 1,063,290, August 1959.

Directory of Nuclear Reactors (DNR), vol. 1, 1959, pp. 39–42, publ. by Intl. Atomic Energy Comm.

Proceedings of 2nd Geneva Conference on Peaceful uses of Atomic Energy, vol. 8, pp. 496–497, 1958.

CARL. D. QUARFORTH, *Primary Examiner.*
REUBEN EPSTEIN, *Examiner.*